United States Patent
Skertic (10) Patent No.: US 9,481,473 B2
(45) Date of Patent: Nov. 1, 2016

(54) DISTRIBUTED CONTROL SYSTEM WITH SMART ACTUATORS AND SENSORS

(71) Applicant: Richard J. Skertic, Carmel, IN (US)

(72) Inventor: Richard J. Skertic, Carmel, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 212 days.

(21) Appl. No.: 14/138,099

(22) Filed: Dec. 22, 2013

(65) Prior Publication Data

US 2014/0303832 A1 Oct. 9, 2014

Related U.S. Application Data

(60) Provisional application No. 61/802,309, filed on Mar. 15, 2013.

(51) Int. Cl.
  B64D 45/00 (2006.01)
  G05B 19/406 (2006.01)
  G05B 23/02 (2006.01)

(52) U.S. Cl.
  CPC ............. B64D 45/00 (2013.01); G05B 19/406 (2013.01); G05B 23/0254 (2013.01); G05B 2219/32369 (2013.01)

(58) Field of Classification Search
  None
  See application file for complete search history.

(56) References Cited

U.S. PATENT DOCUMENTS

| | | |
|---|---|---|
| 6,823,253 B2 | 11/2004 | Brunell |
| 7,020,595 B1 | 3/2006 | Adibhatla et al. |
| 7,152,023 B2 | 12/2006 | Das |
| 7,203,554 B2 | 4/2007 | Fuller |
| 7,219,040 B2 | 5/2007 | Renou et al. |
| 7,285,871 B2 | 10/2007 | Derouineau |
| 7,505,844 B2 | 3/2009 | Wiseman et al. |
| 7,603,222 B2 | 10/2009 | Wiseman et al. |
| 7,620,461 B2 | 11/2009 | Frederick, II et al. |
| 7,742,904 B2 | 6/2010 | Healy et al. |
| 7,822,512 B2 | 10/2010 | Thatcher et al. |
| 7,908,072 B2 | 3/2011 | Tonno et al. |
| 7,933,754 B2 | 4/2011 | Goebel et al. |
| 8,036,805 B2 | 10/2011 | Mahoney et al. |
| 8,065,022 B2 | 11/2011 | Minto et al. |
| 8,090,456 B2 | 1/2012 | Karpman et al. |

(Continued)

FOREIGN PATENT DOCUMENTS

| | | |
|---|---|---|
| EP | 2492473 A2 | 8/2012 |
| EP | 2535694 A1 | 12/2012 |

OTHER PUBLICATIONS

International Search Report for PCT/US2013/077536 mailed Sep. 3, 2014.

*Primary Examiner* — Mussa A Shaawat
*Assistant Examiner* — Kyung Kim
(74) *Attorney, Agent, or Firm* — Fishman Stewart PLLC (57) ABSTRACT

A system for controlling operation of an aircraft engine includes a master controller, a control node coupled to a component of the aircraft engine and to the master controller, wherein the control node includes a computing device for performing diagnosis of the component. The computing device is configured to assess performance of the component during operation of the aircraft, determine whether the component is performing within specification, and if not performing within specification, indicate that the component is out of specification.

8 Claims, 4 Drawing Sheets

(56) References Cited

U.S. PATENT DOCUMENTS

| | | |
|---|---|---|
| 8,131,384 B2 | 3/2012 | Karpman et al. |
| 8,185,292 B2 | 5/2012 | Litt |
| 8,195,311 B2 | 6/2012 | Karpman et al. |
| 2005/0049775 A1 | 3/2005 | Mooney |
| 2005/0075769 A1 | 4/2005 | Eschborn et al. |
| 2009/0071442 A1* | 3/2009 | Emo .................. F02C 7/20 123/446 |
| 2011/0052370 A1 | 3/2011 | Karpman et al. |
| 2012/0072194 A1 | 3/2012 | Arnold et al. |
| 2012/0130617 A1 | 5/2012 | Raimarckers et al. |
| 2012/0194201 A1* | 8/2012 | Saloio ............... G01R 27/26 324/537 |

* cited by examiner

DISTRIBUTED CONTROL SYSTEM WITH SMART ACTUATORS AND SENSORS

CROSS-REFERENCE TO RELATED APPLICATIONS

This application claims priority to U.S. Provisional Patent Application No. 61/802,309, filed Mar. 15, 2013, the contents of which are hereby incorporated in their entirety.

TECHNICAL FIELD

The present disclosure generally relates to control systems and methods, and more particularly to model based distributed control with health monitoring for aircraft, aircraft engines and the like.

BACKGROUND

Complex systems such as aircraft and aircraft engines typically have distributed control system architecture. Such control systems include sensors and actuators that communicate with a master controller (such as an Engine Control Module (ECM), or a full authority digital engine controller (FADEC)) to provide computing parameters or table lookups, etc.

Some distributed control systems include sensor nodes and actuator nodes. Sensor nodes provide information about the physical state of the engine, and actuator nodes received commands or data from various sources to operate an engine actuator. Typically, the sensor nodes and actuator nodes are coupled to the master controller, which allows the distributed architecture, and thereby enables the master controller to be reduced in size. That is, typically the sensor nodes and actuator nodes move functionality from the master controller. The nodes are therefore deemed to be "smart", in that data from the nodes is fed back to the master controller to improve operation of the aircraft, providing adaptive control to improve stall avoidance, improve bandwidth, and system control.

Components (i.e., sensors and actuators) may be calibrated upon power-up or may be checked for performance during periodic maintenance. However, during aircraft operation component wear may occur, which can go unnoticed by the operator because the component may continue to operate beyond its limits or outside of its specification after its performance has degraded. If performance demands are not dialed back, component failure may be accelerated and precipitated by continued use. Also, if component life is estimated based on general population trends of the components or based on standard life models that are generally applied, a component failure may occur unexpectedly even though the component is still within its theoretical life.

Accordingly, there is a need to improve component life assessment in aircraft components.

BRIEF DESCRIPTION OF THE FIGURES

The description herein makes reference to the accompanying drawings wherein like reference numerals refer to like parts throughout the several views, and wherein.

DETAILED DESCRIPTION

A control system architecture and method for controlling an aircraft or aircraft propulsion systems is disclosed. Embodiments include systems and methods in which a fully distributed control architecture system improves performance of the aircraft/engine system, or other complex systems including gas turbine engines for power generator pumping, land and sea propulsion and the like. Other embodiments include apparatuses, systems, devices, hardware, methods, and combinations for aircraft propulsion control. Further embodiments, forms, features, aspects, benefits, and advantages of the present application will become apparent from the description and figures provided herewith.

In one example, a system for controlling operation of an aircraft engine includes a master controller, a control node coupled to a component of the aircraft engine and to the master controller, wherein the control node includes a computing device for performing diagnosis of the component. The computing device is configured to assess performance of the component during operation of the aircraft, determine whether the component is performing within specification, and if not performing within specification, indicate that the component is out of specification.

In another example, a method of monitoring operation of an aircraft engine using a distributed control system architecture includes assessing performance of a component via a component control node of the aircraft engine during operation of the aircraft, determining whether the component is performing within specification, and if not performing within specification, indicating that the component is out of specification.

In yet another example, a control node for monitoring performance of a component of an aircraft includes an electrical coupling to a master controller of the aircraft, and a controller configured to diagnose a condition of the component, the controller configured to assess performance of the component during operation of the aircraft, determine whether the component is performing within specification, and if not performing within specification, indicate that the component is out of specification.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

Figure 1:
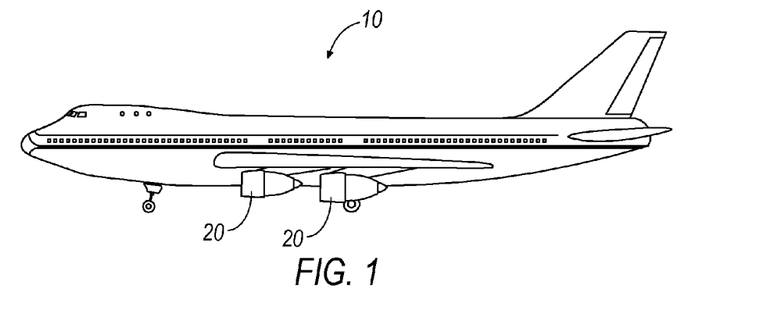
FIG. 1 is an elevation view of one embodiment of an aircraft including a propulsion system.
Figure 2:
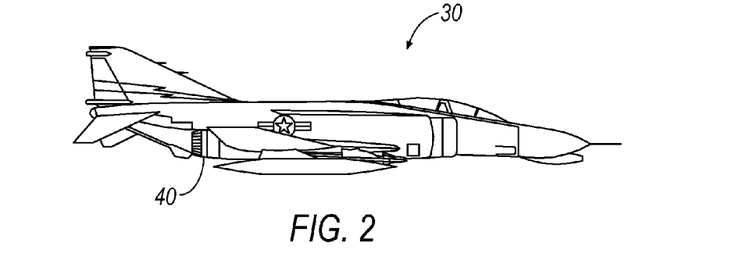
FIG. 2 is an elevation view of another embodiment of an aircraft including a propulsion system.

Referring to FIG. 1, there is illustrated one form of an aircraft 10 including one or more aircraft engines 20 that are used as a power plant for propulsion of aircraft 10, which incorporate embodiments of the disclosure. Though the aircraft 10 is depicted as having multiple engines 20 in the illustrated embodiment, in some forms the aircraft 10 can have a single engine, such as shown with aircraft 30 and engine 40 in FIG. 2. Whether having single or multiple engines, any given engine 20, 40 in any given application can take a variety of forms such as reciprocating engines and gas turbine engines that provide propulsion of aircraft 10, 30. The engine(s) 20, 40 can also power useful devices of various subsystems aboard the aircraft 10, 30, such as, but not limited to, heat management subsystems, nozzle and thrust vectoring subsystems, electrical power subsystems including energy storage devices, power distribution devices, generators, and starters, weapons subsystems, and cockpit subsystems including cockpit lights, instruments, navigational aids and communication devices, to set forth just a few examples. The engine(s) 20, 40 can also be, but are not necessarily, used to power a generator and provide environmental control aboard the aircraft 10, 30.

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the disclosure is contemplated for utilization in other applications that may not be coupled with an aircraft such as, for example, industrial applications, power generation, pumping sets, naval propulsion and other applications known to one of ordinary skill in the art.

The aircraft engines 20 and 40 can take any variety of forms. In some embodiments the aircraft engines 20 and 40 are the same, but in other embodiments the engines 20 and 40 can be different and/or can perform different functions. To set forth a few examples of the forms that either or both of the engines 20 and 40 can take, reference is made to one embodiment of aircraft engine 20 in FIG. 3.

Figure 3:
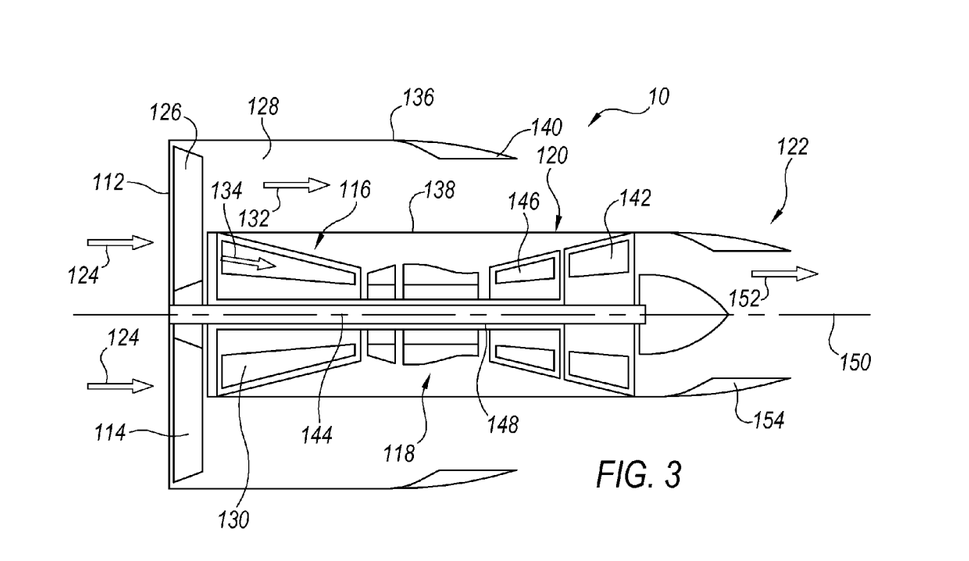
FIG. 3 schematically illustrates aspects of an exemplary propulsion system that includes a gas turbine engine in accordance with one embodiment.

The illustrative embodiment in FIG. 3 depicts an exemplary aircraft engine 20 as a gas turbine engine and is shown including an inlet section 112, a fan section 114, a compressor section 116 for compressing air, a combustor section 118 for burning a mixture of fuel and the compressed air, a turbine section 120 used to expand the combusted mixture of fuel and air, and an exhaust section 122. Though the gas turbine engine 20 is shown as a single spool turbojet engine, other embodiments can include additional numbers of spools and can take other forms such as a turbofan, a turboprop, or a turbo shaft. In some embodiments the gas turbine engine 20 can be an adaptive cycle and/or variable cycle engine.

In operation of the illustrated embodiment of engine 20, air illustrated by arrows 124 is drawn in through the inlet section 112 and passes through at least one fan stage 126 of the fan section 114 where the ambient air is compressed. After passing through the fan section 114, the air is split into a plurality of flow streams. In this exemplary embodiment, the airflow is split into a bypass duct 128 and a core passageway 130. Airflow through the bypass duct 128 and the core passageway 130 is illustrated by arrows 132 and 134 respectively. The bypass duct 128 encompasses the core passageway 130 and can be defined by an outer circumferential wall 136 and an inner circumferential wall 138. The bypass duct 128 can also include a bypass nozzle 140 operable for creating a pressure differential across the fan 126 and for accelerating the bypass airflow 132 to provide bypass thrust for the turbofan engine 10.

The core airflow 134 enters the core passageway 130 after passing through the fan section 114. The core airflow 134 is then further compressed in the compressor section 116 to a higher pressure relative to both ambient pressure and the air pressure in the bypass duct 128. The air is mixed with fuel in the combustor section 118 wherein the fuel/air mixture burns and produces a high temperature working fluid from which the turbine section 120 extracts power. The turbine section 120 can include a low pressure turbine 142 mechanically coupled to the fan section 114 through a low pressure shaft 144 and a high pressure turbine 146 mechanically coupled to the compressor section 116 through a high pressure shaft 148. The shafts 144, 148 rotate about a centerline axis 150 that extends axially along the longitudinal axis of the engine 10 such that as the turbine section 120 rotates due to the forces generated by the high pressure working fluid from combustor section 118, the fan section 114 and compressor section 116 section are rotatingly driven by the turbine section 120 to produce compressed air. After passing through the turbine section 120, the core exhaust flow represented by arrow 152 is accelerated to a high velocity through a core exhaust nozzle 154 to produce thrust for the turbofan engine 10.

Figure 4A:
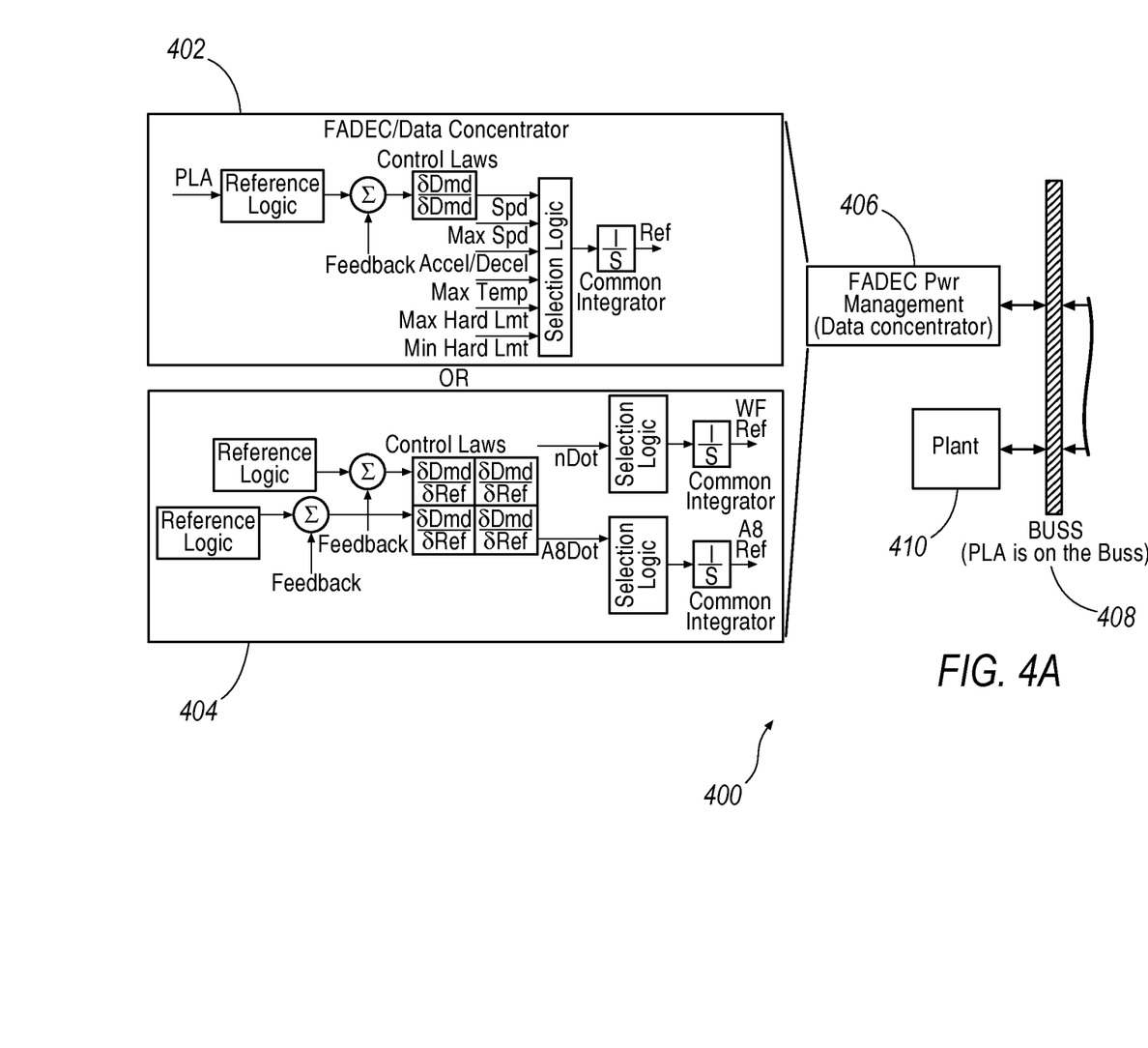
FIG. 4A illustrates a Full Authority Digital Engine Control (FADEC) for a system control architecture.
Figure 4B:
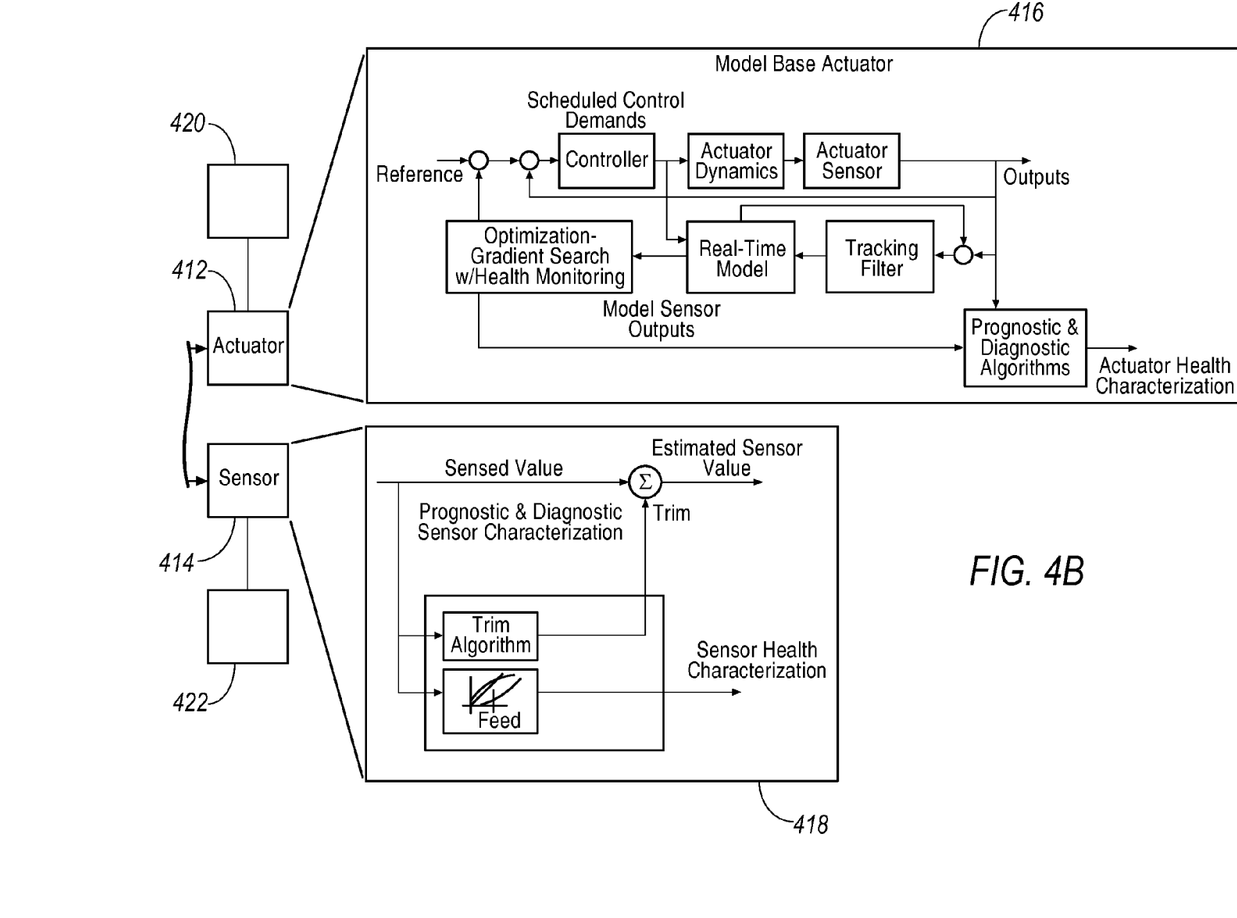
FIG. 4B illustrates is a schematic diagram for a fully distributed model-based control (MBC) architecture for monitoring an exemplary actuator and an exemplary sensor.

FIG. 4A illustrates a Full Authority Digital Engine Control (FADEC) for a system control architecture, and FIG. 4B illustrates is a schematic diagram for a fully distributed model-based control (MBC) architecture for monitoring an exemplary actuator and an exemplary sensor. Thus, during operation of an aircraft, a master controller such as a FADEC/Data Concentrator 402 can be associated with a smart component such that the smart component can independently determine a command, an operation, a position or the like through internal computer processing and algorithm feedback of control logic and the like. Inputs such as speeds, accelerations, temperatures including minimum and maximum limits can be processed through a selection logic algorithm and sent to a FADEC power management data concentrator.

The smart component can break up signals and decision points into smaller discreet areas of selection logic to include closed loop feedback at lower level in the control architecture as shown in 404. A FADEC power management system 406 can receive and transmit communication signals between the high level data concentrator 402 and the discreet data concentrator 404. A data bus 408 may transmit communication signals between the FADEC power management system 406, a plant 410, and a control node that includes a smart actuator controller 412 and/or a smart sensor controller 414. The smart actuator controller 412 and the smart sensor controller 414 can communicate respectively with a model based actuator control system 416 and a prognostic and diagnostic control system 418. Components 420, 422 may be coupled respectively to smart actuator controller 412 and smart sensor controller 414.

Smart components, according to the disclosure, may include a smart actuator controller 412 wherein component 420 is a pump (fuel, coolant, etc.), solenoid, compression rings of a piston, and the like. Smart components may also include a smart sensor controller 414 wherein component 422 is a temperature sensor, frequency sensor, and the like. According to the disclosure, smart components may include model-based principles such as a real-time model (416) or a real-time health characterization capability (418). Thus, the current disclosure uses model-based or real-time measurement-based principles to track operation of smart component controllers 412, 414, improve on controllability of the components, and allow for component self-diagnosis issues through prognostic and degradation schemes.

Figure 5:
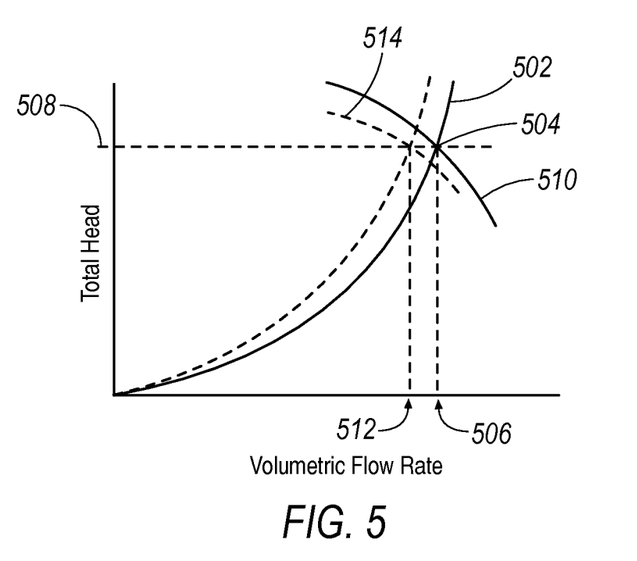
FIG. 5 is an exemplary pump curve illustrating pump degradation.

In one example, a piston fuel pump over time wears out the compression rings of the piston, causing an upper pumping limit to be reached. The model based actuator control system 416 tracks this degradation and can correct for it as it wears out during use. Referring to FIG. 5, pump curves 500 are illustrated for an exemplary pump and to illustrate use of a smart component, according to the disclosure. It is contemplated that pump curves 500 are merely exemplary, and any pump (and corresponding pump curves) may be used, according to the disclosure. That is, reciprocating or rotary pumps are contemplated, and pumps such as direct lift, displacement, or gravity pumps may be included, and thus the example is not limited to a piston fuel pump or even to pumps in general. Rather, component 420 may be any type of component in an aircraft that ages and that may include performance curves that can indicate when failure occurs or is in the process of occurring.

Pump curves 500 include a typical pump curve 502 that describes, at an operating point 504, a given volumetric flow rate 506 that corresponds to a total head pressure 508. Performance of the typical (or un-degraded) pump follows a pump performance curve 510 that describes the typical performance, which can be used to determine other flow rates for different head. However, if pump degradation occurs, then for the given head 508 the volumetric flow rate 512 is decreased for the same head 508, representing a degraded performance that may track a new performance curve 514. Thus, according to the disclosure and according to the example of FIG. 5, pump degradation may occur to the extent that the drop in performance (from volumetric flow rate 506 within original specification to the degraded flow rate 512), which can be determined using, for instance, a control node such as smart actuator controller 412 and actuator control system 416. The degraded performance curve 514 may be determined or modeled using a real-time computer mode, or may be based on measured performance curves that correspond to component degradation. In other words, by measuring the performance in real-time, the measured performance can be compared to a model or to a known degradation curve or curves, and when the performance is not within specification, then smart actuator controller 412 may indicate that the component is out of specification to a user via the FADEC.

Figure 6:
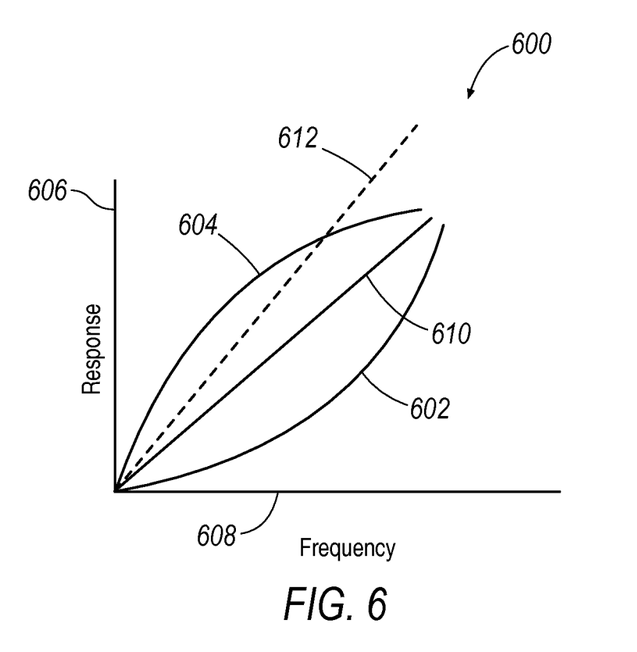
FIG. 6 is an exemplary sensor curve illustrating sensor degradation.

In one example and as stated, component 420 may a component such as an actuator that may include a pump or solenoid that may be modeled or monitored using known performance curves. However, in another example a component such as component 422 may be a sensor that may likewise be monitored for performance and determined in real-time in an aircraft if performing within specification. Referring to FIG. 6, frequency response plot 600 illustrates a bounded lower curve 602 and upper curve 604 that describe a response 606 as a function of frequency 608. In this example, an initial performance curve 610 falls within bounds 602, 604 and indicates a performance specification of a new, or un-degraded, component. However, as degradation occurs, a subsequent response curve 612 may occur to the point that over an operating frequency range, the degraded response curve 612 falls outside the bounds 602, 604. Curves 602, 604 represent an exemplary frequency response requirement of a sensor, but it is contemplated that other such performance curves for other sensor types may likewise be described based on an initial performance characteristic, after which degradation falls outside the bounds 602, 604.

Thus, according to the disclosure and according to the example of FIG. 6, sensor degradation may occur to the extent that the degradation in performance, which can be determined using, for instance, a control node such as smart sensor controller 414 and sensor control system 418. The degraded performance curve 612 may be determined using a real-time measurement. In other words, by measuring the performance in real-time, the measured performance can be compared to bounded degradation curves 602, 604, and when the performance is not within specification, then smart sensor controller 414 may indicate that the component is out of specification to a user via the FADEC.

The disclosed architecture is an extension of a common distributed control system architecture. A model based principle/methodology has been applied to each of the actuators, or an operating constraint for the sensors. Each actuator is considered to be a smart actuator having a position loop closure localized to the actuator. Along with this smart actuator is the self-diagnostic/prognostic algorithm to communicate the status of the actuator. The sensor is also considered a smart device and it will utilize trending techniques in its own self diagnostic/prognostic algorithm. Both the actuator and sensor will communicate their status across a deterministic bus network to the main data concentrator sub-system.

Diagnostics are improved with the use of the model-based approach since the model will match the component as it ages/wears out. The model-based approach can result in weight reduction through simplified wiring, elimination of a centralized controller, and a faster and cheaper certification process. Active and smart control components result in self-diagnostic/prognostic actuator health reporting, self-diagnostic/prognostic trending sensor health reporting, local loop closures, and matching actual actuator component characteristics that allows steady state and transient component margins to be reduced.

The disclosure includes distributing control system components to form a distributed system which includes smart actuators and smart/active sensors. The disclosure improves on this by utilizing model-based principles to allow the smart component to track the real component, improve controllability of the component, and allow for the component to self-diagnose issues through prognostic and degradation schemes. For example, a piston fuel pump over time wears out the compression rings of the piston causing the upper pumping limit to be reduced. The model-based component controller is designed to track this degradation and can correct for it as it wears out during use. The associated prognostic algorithms can detect such an issue and communicate the problem before the compensation for the reduced flow is maximized.

Thus, control of high performance military aircraft propulsion systems continues to become more complex in response to increasingly demanding operational and multiple mission needs for aircraft and/or aircraft engine systems will include adaptive engine control to enable precise and repeatable performance within stringent reliability, safety and cost constraints. To achieve desired performance, propulsion control systems evolve towards advanced designs with multivariable control systems and integrate numerous systems, including inlet, exhaust, power and bleed extraction, electrical power, thermal and environmental management, fuel, starting, accessories, aircraft flight control, and often propellers, open rotors, or lift fans. Fully distributed model-based architecture with smart sensors and actuators can be a solution to future control systems. Due to the significant growth in complexity and number of control variables coupled with the demands of multivariable implementation, software development and verification tools support the disclosed model-based development and cost-effective validation and verification strategies.

Future turbine engines include the capability to adapt to multiple mission profiles. These adaptive turbine engines include improved performance, safety, and reliability at reduced life cycle costs, leading to more complex control systems. Variable turbine engine cycles can be characterized by the number of control variables that influence the behavior of the gas turbine while still meeting performance and safety specifications. As such, a model-based distributed control architecture with an advanced Prognostic and Health Management (PHM) system is an element of the present disclosure.

A turbine engine controller has many complex functions, such as to provide thrust in response to throttle position set by the pilot or flight control system. These functions are embedded into a FADEC ("Full Authority Digital Engine Control"). The FADEC achieves the requested thrust with the lowest Specific Fuel Consumption (SFC) and ensures that the engine limits are not exceeded. These limits include: maximum fan and compressor speeds, turbine and exhaust temperatures, compressor discharge pressure, and rich burner blowout; minimum fan and compressor stall margins, compressor discharge pressure, and lean burner blowout, as examples. To achieve minimum SFC, the cycle operates at peak efficiency without violating component mechanical and thermal limits. Engine operation at the demanded thrust can lead to operation at one or more of engine operating limits and at the lowest SFC, noise and emissions.

Many aircraft engines, both commercial and military, use sensor-based control. That is, because engine characteristics such as thrust and stall margins cannot be measured, control systems typically infer these parameters from sensed values. Thus, corrected fan rotor speed or engine pressure ratio are sensed and used as feedback parameters in closed-loop control systems. The relationship between the sensed variables (e.g., rotor speed) and parameters of interest (e.g., thrust) is not exact and subject to variation due to manufacturing tolerances, sensor errors, and engine deterioration. Therefore, steady-state performance design margins are often relatively large. The same is true of transient design margins such as those associated with a burst from idle to full power, during which compressor stall margin is consumed.

Thus, in one example, a fully distributed, model-based control architecture uses a model of the plant in the controller (engine model in the FADEC) to compute and directly control thrusts and stall margins. Another feature of model-based control is a "tracking filter", which is essentially a parameter estimation algorithm. The tracking filter uses available sensors to update the model to match actual engine characteristics. The use of model-based controls allows steady state and transient margins to be reduced. Thus, although controls do not typically set performance capabilities (the turbo machinery does), they enable more of the available performance to be realized by enabling smaller margins while maintaining engine safety and operability.

Turbine engine performance depends on the control of a desired output in the presence of constraints using a large number of input variables to achieve the desired performance and safety limits. The interactions between various inputs and outputs, stringent accuracy, and desired response, system cost, reliability, and maintainability demand a highly stable and robust control system. Model-based control systems streamline the implementation of multiple interactions and system constraints.

A distributed control system on an aircraft engine includes numerous advantages, including weight reduction through simplified wiring and elimination of a centralized controller, a faster and cheaper certification process, and use of active and smart control components. Smart sensors (which include electronics for signal conversion), smart pressure transducers and smart actuators reduce wiring, tubing, communication delays, etc. Also, diagnostic sensors used in PHM are more amenable to being replaced with wireless sensors than control sensors used for safe operation of the engine.

Fully distributed control systems include a real-time prognostics and health monitoring (PHM) system for detecting and isolating faults, for generating pilot alerts, for trending and estimating gas-path and subsystem health, and for performing life and damage calculations. This enables a condition-based maintenance program in lieu of a schedule driven maintenance system. The PHM system includes fusion algorithms and reasoners to integrate results from various diagnostic algorithms into unambiguous recommendations, thereby improving mission readiness, and reducing operating and line-maintenance costs. Engine health assessment can enable an intelligent control system capable of controlling reconfiguration to react to aircraft damage, such as may occur in battle. Controls and diagnostics functions are integrated into the control system and PHM system that is model-based, state-aware, and capable of multi-objective optimization in real time.

In one example, corrected fan rotor speed or engine pressure ratio are sensed and used as feedback parameters in closed-loop control systems. Also, model-based control (MBC) uses a model of the plant in the controller (engine model in the FADEC) to compute and directly control thrusts and other immeasurable parameters. One feature of model-based control is a "tracking filter", which is essentially a parameter estimation algorithm. A tracking filter uses available sensors to update the model to match actual engine characteristics. The tracking filter techniques include classical observers, Kalman and extended Kalman filters, and PI controllers.

The use of parallel processing and multi-core processors can offer new opportunities in control system design. Current engines typically use single-input, single output (SISO) controllers, and interactions between control loops are ignored. However, SISO controllers are generally inadequate for modern military engines, as such engines have variable cycle features, increased bandwidth, and tighter decoupling requirements. This leads to use of multivariable, i.e., multi-input, multi-output (MIMO), controls.

The PHM system for modern jet engines will also include fusion algorithms and reasoners to integrate results from various diagnostic algorithms into unambiguous recommendations, thereby improving mission readiness, and reducing operating and line-maintenance costs. The model based control architecture of the disclosure includes an integrated ground-based and on-board control, diagnostic, and prognostic systems, to maximize engine time-on wing while minimizing support cost without compromising performance and survivability.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system for controlling operation of an aircraft engine, comprising:
    a master controller including a Full Authority Digital Engine Control (FADEC);
    a control node device coupled to a solenoid of the aircraft engine and to the master controller, the solenoid operable based on a frequency response curve and between a bounded lower curve and a bounded upper curve, wherein the control node device:
        tracks performance of the solenoid during operation of the aircraft;
        compares the tracked performance with the bounded lower and bounded upper curves;
        determines whether the solenoid of the aircraft engine is performing within specification based on the comparison of the tracked performance against the bounded lower and bounded upper curves; and
        if not performing within specification, indicates that the solenoid is out of specification; and
    wherein the FADEC controls thrust in response to the indication from the control node device.

2. The system of claim 1, wherein the control node further:
    tracks the performance of the solenoid by determining at least one performance characteristic at a given operating point of the component; and
    determines whether the solenoid is performing within specification based on the comparison.

3. The system of claim 1, wherein the FADEC further controls a stall margin in response to the indication.

4. A method of monitoring operation of an aircraft engine using a distributed control system architecture with a Full Authority Digital Engine Control (FADEC), comprising:
    tracking performance of a solenoid via a solenoid control node device of the aircraft engine during operation of the aircraft, the solenoid operable based on a frequency response curve and between a bounded lower curve and a bounded upper curve;
    comparing the tracked performance with a model performance;
    determining whether the solenoid of an aircraft engine is performing within specification c based on the comparison of the tracked performance against the bounded lower and bounded upper curves;
    if not performing within specification, indicating that the solenoid is out of specifications and
    controlling, with the FADEC, thrust in response to the indication.

5. The method of claim 4, further comprising:
    tracking the performance of the solenoid by determining at least one performance characteristic at a given operating point of the solenoid; and
    determining whether the solenoid is performing within specification based on the comparison.

6. A control node device for monitoring performance of a solenoid of an aircraft, comprising:
    an electrical coupling to a master controller of the aircraft;
    a controller configured to diagnose a condition of the solenoid, wherein the controller:
    tracks performance of the solenoid during operation of the aircraft;
    compares the tracked performance with a model performance;
    determines whether the solenoid of the aircraft is performing within specification based on the comparison: and
    if not performing within specification, indicates that the solenoid is out of specification;
    wherein the specification is an area between the bounded lower and bounded upper curves of a frequency response curve; and
    wherein the master controller includes a Full Authority Digital Engine Control (FADEC) that controls thrust in response to the indication from the controller.

7. The control node device of claim 6, wherein the controller further:
    tracks the performance of the solenoid by determining at least one performance characteristic at a given operating point of the solenoid; and
    determines whether the solenoid is performing within specification based on the comparison, by comparing the tracked performance against the bounded lower and bounded upper curves.

8. The control node device of claim 6, wherein the model performance includes performance curves for the solenoid, and the control node device further:
    tracks the performance of the solenoid by determining at least one performance characteristic at a given operating point of the solenoid; and
    determine whether the solenoid is performing within specification by comparing the assessed performance against at least one of the performance curves.

* * * * *